United States Patent
Kim et al.

(10) Patent No.: US 10,031,262 B2
(45) Date of Patent: Jul. 24, 2018

(54) TRANSPARENT SUBSTRATE WITH MULTILAYER ANTI-GLARE COATING

(71) Applicants: Hyundai Motor Company, Seoul (KR); KCC Corporation, Seoul (KR)

(72) Inventors: Sang Young Kim, Hwaseong-si (KR); Kyoung Hwan Bae, Yeoju-si (KR); Jung Ju Kim, Yeoju-si (KR)

(73) Assignees: HYUNDAI MOTOR COMPANY, Seoul (KR); KCC CORPORATION, Seoul (KR)

( * ) Notice: Subject to any disclaimer, the term of this patent is extended or adjusted under 35 U.S.C. 154(b) by 95 days.

(21) Appl. No.: 15/174,448

(22) Filed: Jun. 6, 2016

(65) Prior Publication Data

US 2017/0031063 A1 Feb. 2, 2017

(30) Foreign Application Priority Data

Jul. 31, 2015 (KR) .................. 10-2015-0108885

(51) Int. Cl.
- *G02B 27/00* (2006.01)
- *G02B 1/115* (2015.01)
- *C03C 17/34* (2006.01)
- *G02B 1/111* (2015.01)
- *B60J 3/00* (2006.01)

(52) U.S. Cl.
CPC .............. *G02B 1/115* (2013.01); *B60J 3/007* (2013.01); *C03C 17/34* (2013.01); *C03C 17/3435* (2013.01); *G02B 1/111* (2013.01); *C03C 2217/00* (2013.01); *C03C 2217/734* (2013.01)

(58) Field of Classification Search
CPC .... G02B 1/115; G02B 5/0825; G02B 5/0858; G02B 5/3008
USPC ......................................... 359/601–614, 332
See application file for complete search history.

(56) References Cited

U.S. PATENT DOCUMENTS

| 6,337,771 | B1 * | 1/2002 | Chu ....................... G02B 1/116 313/635 |
| 6,387,515 | B1 | 5/2002 | Joret et al. |
| 6,489,028 | B1 * | 12/2002 | Degand .................. G02B 1/105 351/159.57 |

(Continued)

FOREIGN PATENT DOCUMENTS

| FR | 2858816 A1 | 2/2005 |
| JP | 11-49532 A | 2/1999 |

(Continued)

*Primary Examiner* — Bumsuk Won
*Assistant Examiner* — Tamara Y Washington
(74) *Attorney, Agent, or Firm* — McDermott Will & Emery LLP

(57) ABSTRACT

A transparent substrate with a multilayer anti-glare coating includes a transparent substrate; a first coating layer formed on the transparent substrate and being formed of a first dielectric layer having a refractive index of n1; a second coating layer formed on the first coating layer and being formed of a metal oxide layer having a refractive index of n2; a third coating layer formed on the second coating layer and being formed of a second dielectric layer having a refractive index of n3; and a fourth coating layer formed on the third coating layer and being formed of a third dielectric layer having a refractive index of n4. The refractive indexes of the coating layers satisfy: n1=n3>n2>n4.

7 Claims, 1 Drawing Sheet

(56) References Cited

U.S. PATENT DOCUMENTS

| | | | |
|---|---|---|---|
| 8,817,376 B2* | 8/2014 | Lee ........................ | G02B 1/11 |
| | | | 359/588 |
| 2002/0034641 A1* | 3/2002 | Ebisawa ................ | C03C 17/36 |
| | | | 428/426 |
| 2002/0182393 A1 | 12/2002 | Chu | |
| 2007/0188871 A1 | 8/2007 | Fleury et al. | |
| 2012/0212826 A1 | 8/2012 | Henn et al. | |
| 2014/0139910 A1* | 5/2014 | Gafsi ...................... | G02B 1/11 |
| | | | 359/352 |

FOREIGN PATENT DOCUMENTS

| | | |
|---|---|---|
| JP | 2001-201606 A | 7/2001 |
| JP | 2002-539004 A | 11/2002 |
| KR | 10-0084491 | 11/1994 |
| KR | 1997-0000902 B1 | 1/1997 |
| KR | 10-2001-0074731 A | 8/2001 |
| KR | 10-2002-0033579 A | 5/2002 |
| KR | 10-1015155 B1 | 2/2011 |

* cited by examiner

TRANSPARENT SUBSTRATE WITH MULTILAYER ANTI-GLARE COATING

CROSS-REFERENCE TO RELATED APPLICATION

This application claims under 35 U.S.C. § 119(a) the benefit of priority to Korean Patent Application No. 10-2015-0108885, filed on Jul. 31, 2015, the entirety of which is incorporated herein by reference.

TECHNICAL FIELD

The present disclosure relates to a transparent substrate with a multilayer anti-glare coating, and more particularly to a transparent substrate with a multilayer anti-glare coating which may effectively prevent glares such as veiling reflection, disability glare, etc. by decreasing reflectivity through formation of multiple coating layers having a different refractive index on a transparent substrate.

BACKGROUND

Glare refers to the phenomenon where, when light sources with high luminance and objects reflecting light are in sight, seeing objects becomes difficult because of the light entering the eyes (disability glare), or it is unpleasant to look at the objects because of the glare (discomfort glare).

Glare is a problem directly related to driver safety, and research into preventing such glare effects is actively underway in the automobile industry. Representative examples of glare include discomfort glare, disability glare, veiling reflection, etc.

Discomfort glare and disability glare denote that a much brighter object than the subject of interest is in sight. Thus, the bright object causes unpleasant feelings whenever the subject is observed, or the subject is not observed due to reduced sight sensitivity.

As an example of disability glare, at night, the light of the headlights of automobiles coming from an opposite direction may come into the sight of a driver and instantaneously stimulate the retinas of the driver, thereby causing temporary visual impairment. When driver safety is considered, disability glare must be prevented.

Veiling reflection denotes that light is overlapped with a subject by regular reflection or diffuse reflection. As an example of veiling reflection, a faint shape of a dashboard may be overlapped with the front glass of an automobile by light reflected from the dashboard of the automobile and thus the sight of the driver may be disturbed. Like disability glare, veiling reflection is also a problem that is directly related to driver safety and thus must be addressed.

Such glare is generally addressed by anti-reflective coating of automobile glass. In particular, in order to prevent glare, multiple coating layers are formed on a substrate and reflectivity is decreased by controlling a refractive index of each layer.

The prior art discloses a glass plate for automobiles including a reflectivity-reducing film having a two-layer structure. In the prior art, a refractive index of each layer of the film is varied, and veiling reflection is prevented by decreasing reflectivity of visible light illuminated to automobiles.

The prior art also discloses a transparent substrate including an anti-reflective coating. For example, a dielectric material having a high refractive index and a dielectric material having a low refractive index may be alternatively arranged in the anti-reflective coating to prevent glare by decreasing reflectivity.

Since glare is a problem that is directly related to driver safety as described above, further enhanced anti-reflective coating technology to completely address such a problem is required.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

Therefore, the present disclosure has been made in view of the above problems, and it is an object of the present disclosure to provide a transparent substrate with a multilayer anti-glare coating which may prevent a veiling phenomenon by measuring an angle of a transparent substrate installed in a front side of an automobile and then maximally decreasing reflectivity at the angle.

It is another object of the present disclosure to provide a transparent substrate with a multilayer anti-glare coating which may prevent disability glare caused by light from headlights of coming automobiles by increasing a luminous flux of scotopic vision with respect to photopic vision of the transparent substrate.

The objects of the present disclosure are not limited the above-listed objects. The objects of the present disclosure will be further clarified and will be accomplished through means claimed in the following claims and combinations thereof.

In accomplishing the objects of the disclosure, the following compositions may be included.

In one aspect, the present invention provides a transparent substrate with a multilayer anti-glare coating comprising a transparent substrate; a first coating layer formed on the transparent substrate and being formed of a first dielectric layer having a refractive index of n1; a second coating layer formed on the first coating layer and being formed of a metal oxide layer having a refractive index of n2; a third coating layer formed on the second coating layer and being formed of a second dielectric layer having a refractive index of n3; and a fourth coating layer formed on the third coating layer and being formed of a third dielectric layer having a refractive index of n4. The refractive indexes of the coating layers satisfy: $n1=n3>n2>n4$.

In one embodiment, the refractive indexes of the coating layers include n1 and n3 within the range 1.9 to 2.5, n2 within the range 1.8 to 2.5, and n4 within the range 1.3 to 1.6.

In one embodiment, the second coating layer has an extinction coefficient within the range 0.01 to 0.03.

In one embodiment, a thickness of the first coating layer is 1 to 50 nm, a thickness of the second coating layer is 10 to 150 nm, a thickness of the third coating layer is 10 to 100 nm, and a thickness of the fourth coating layer is 30 to 200 nm.

In one embodiment, a glass for automobiles comprises the transparent substrate. The transparent substrate may be installed at an angle of 50 to 70° from a direction perpendicular to the ground.

In one embodiment, the first coating layer and the third coating layer comprise at least one selected from the group consisting of zinc oxide, tin oxide, zirconium oxide, zinc-tin oxide, titanium oxide, titanium oxynitride, niobium oxide, silicon nitride, silicon-aluminum nitride and titanium nitride.

In one embodiment, the second coating layer comprises at least one selected from the group consisting of tungsten (W) oxide, iron (Fe) oxide and titanium (Ti) nitride, or a combination thereof.

In one embodiment, the fourth coating layer comprises at least one selected from the group consisting of silicon oxide, silicon oxynitride, silicon oxycarbide, silicon-aluminum oxide and silicon-aluminum nitride, or a combination thereof.

In one embodiment, a glass for automobiles comprises the transparent substrate.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
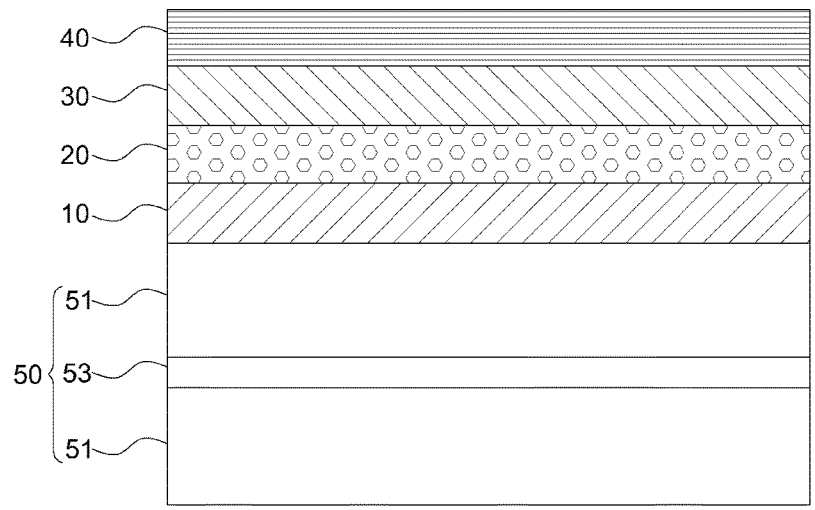
FIG. 1 illustrates a simplified structure of a transparent substrate with a multilayer anti-glare coating according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

While describing the embodiments, detailed descriptions about related well-known functions or configurations that may diminish the clarity of the points of the embodiments of the present invention are omitted. In the present specification, it should be understood that the term "including" is intended to indicate that other constituents may be further included.

Veiling reflection indicates a phenomenon that light is overlapped with a subject due to regular reflection or diffuse reflection having high directivity. When light illuminated through a front glass of an automobile, and the light is reflected from the automobile dashboard, the reflected light may be re-reflected from an inner side (driver's side) of the front glass. A faint shape of the dashboard may thus be formed in the front glass. Accordingly, subjects, which a driver watches, and the dashboard shape may be overlapped and the view of the driver is disturbed.

The degree of veiling reflection varies according to the installation angle of the automobile front glass. Accordingly, in the present disclosure, the reflectivity of a transparent substrate is decreased by controlling the installation angle.

Disability glare denotes that a much brighter object than the subject of interest is in sight, whereby eye sensitivity is decreased and the subject is not temporarily seen. Disability glare is more serious at night. Glare is more serious when eyes adapted to a dark environment are suddenly exposed to bright light, compared to when eyes adapted to a bright environment are suddenly exposed to bright light.

Such a phenomenon occurs since eye sensitivity in daytime differs from eye sensitivity at night. Human eyes in daytime are very sensitive to green-type light having a wavelength range of 555 nm, and human eyes at night are very sensitive to light having a wavelength range of 507 nm. Accordingly, when eyes adapted to a dark environment are suddenly exposed to light having a wavelength range higher than 507 nm, temporary visual disorder is caused by decreased eye sensitivity to the light.

The degree of such temporary visual disorder may be represented by a luminous flux ratio of scotopic vision with respect to photopic vision.

Luminous flux denotes the amount of light passing through a surface per unit time. The luminous flux of scotopic vision denotes the total amount of light in a dark light area, i.e., a wavelength range of 380 to 525 nm, which may be easily distinguished at night. The luminous flux of photopic vision denotes the total amount of light in a bright light area, i.e., a wavelength range of 530 to 780 nm, which may be easily distinguished in daytime.

In the present disclosure, a luminous flux ratio of scotopic vision with respect to the photopic vision is represented by a value of scotopic vision/photopic vision (S/P).

At night, the luminous flux of scotopic vision is considered to be constant. Accordingly, the S/P value at night depends upon the luminous flux of photopic vision. When this is applied to the disability glare described above, a low S/P value means that the amount of light of headlights of automobiles coming on the other side (bright light having a wavelength range of 530 to 780 nm easily distinguished in daytime) coming through a front glass at night is large. This means that a driver has a serious visual disorder.

On the other hand, a high S/P value means that the amount of light of headlights of automobiles coming on the other side coming through a front glass at night is small. This means that a driver has a light visual disorder, i.e., low glare.

Accordingly, in the present disclosure, drivers' visual disorder due to disability glare is decreased by decreasing the amount of light having a wavelength range of 530 to 780 nm (the luminous flux of photopic vision) coming through a front glass and by increasing an S/P value of a transparent substrate.

Referring to FIG. 1, the transparent substrate with a multilayer anti-glare coating according to the present disclosure may include a transparent substrate 50, a first coating layer 10 having a refractive index of n1 formed on the transparent substrate 50, a second coating layer 20 having a refractive index of n2 formed on the first coating layer 10, a third coating layer 30 having a refractive index of n3 formed on the second coating layer 20, and a fourth coating layer 40 having a refractive index of n4 formed on the third coating layer 30.

The first to fourth coating layers may have a refractive index that satisfies the condition of n1=n3>n2>n4. Accordingly, the transparent substrate with a multilayer anti-glare coating may include multilayer coating composed of high-refractivity layer (first coating layer), medium-refractivity layer (second coating layer), high-refractivity layer (third coating layer), and low refractivity layer (fourth coating layer).

The transparent substrate with a multilayer anti-glare coating may be used as glass for automobiles, particularly installed as a front glass of automobiles. In addition, an installation angle thereof may be properly controlled depending upon use, preferably may be 50 to 70° from a vertical side.

The fourth coating layer of the transparent substrate with a multilayer anti-glare coating is installed in a driver seat direction, i.e. toward the interior of an automobile.

The transparent substrate 50 may be a glass substrate 51, a transparent plastic substrate 53 or a combination thereof.

As the glass substrate 51, general glasses such as soda-lime glass, low-iron float glass, or the like may be used, but the present invention is not limited thereto.

As the transparent plastic substrate 53, a substrate manufactured from a polymer material selected from polycarbonate, polymethylmethacrylate, polyethylene terephthalate, polybutylene terephthalate, polyimide, Bakelite, polyvinyl butyral and combinations thereof may be used.

As illustrated in FIG. 1, the transparent substrate 50 may particularly include a pair of the glass substrates 51 and the transparent plastic substrate 53 disposed therebetween.

The thickness of the transparent substrate 50 may be freely controlled within a range of 1 to 8 mm, particularly 1 to 4 mm, depending upon intended use.

The first coating layer 10 and the third coating layer 30 may be dielectric layers having a refractive index of respectively n1 and n3.

n1 and n3 may be particularly within 1.9 to 2.5.

The first coating layer 10 and the third coating layer 30 may be dielectric layers manufactured from one or more metal oxides or metal oxynitrides selected from the group consisting of zinc oxide, tin oxide, zirconium oxide, zinc-tin oxide, titanium oxide, titanium oxynitride and niobium oxide, or one or more nitrides selected from silicon nitride, silicon-aluminum nitride and titanium nitride. Here, when economic efficiency and strength are considered, particularly silicon nitride ($Si_3N_4$), silicon-aluminum nitride ($Si_xAl_yN_z$, where x=2 to 3, y=0.05 to 0.1, Z=3 to 4) and a combination thereof may be used.

The thickness of the first coating layer 10 may be 1 to 50 nm, particularly 5 to 30 nm. When the thickness is thinner than 5 nm, alkali ingredients diffused from the transparent substrate 50 are delivered to the second coating layer 20 and thus durability of the second coating layer 20 may be decreased. In addition, when the thickness is thicker than 30 nm, surface stress difference between the transparent substrate 50 and the second coating layer 20 is large and thus adhesion may be decreased.

The thickness of the third coating layer 30 may be 10 to 100 nm, particularly 30 to 80 nm.

The second coating layer 20 may be a metal oxide layer having a refractive index of n2 and an extinction coefficient of 0.01 to 0.30.

n2 may be 1.8 to 2.5, particularly less than n1 and n3.

The second coating layer 20 is a metal oxide layer, unlike other coating layers, and absorbs light. The second coating layer 20 absorbs a bright light area, i.e., a wavelength range of 530 to 780 nm, easily distinguished in daytime. Accordingly, the luminous flux of photopic vision is decreased and an S/P value is increased. Accordingly, disability glare is decreased and drivers' sight is not disturbed.

The second coating layer 20 may be a metal oxide layer manufactured from any one of tungsten (W) oxide, iron (Fe) oxide and titanium nitride (TiN), or a combination thereof, which may absorb light having a wavelength range of 530 to 780 nm.

The thickness of the second coating layer 20 may be 10 to 150 nm, particularly 20 to 80 nm.

The fourth coating layer 40 may be a low refractivity dielectric layer having a refractive index of n4.

n4 may be 1.3 to 1.6 and, particularly, smaller than n2.

The fourth coating layer 40 may be a low refractivity dielectric layer manufactured from any one of silicon oxide, silicon oxynitride, silicon oxycarbide, silicon-aluminum oxide and silicon-aluminum nitride, or a combination thereof.

The thickness of the fourth coating layer 40 may be 30 to 200 nm, particularly 50 to 150 nm.

As described above, the first to fourth coating layers have a refractive index and thickness that satisfy the condition of n1=n3>n2>n4, and thus, reflectivity of a transparent substrate including the anti-glare multilayer coating may be decreased. The first to fourth coating layers may decrease reflection at an interface generated by difference between the refractive index of the transparent substrate and the refractive index of air, by using destructive interference of light.

In addition, the second coating layer absorbs light having a wavelength range of 530 to 780 nm, and thus, reflectivity may be further decreased and, as described above, an S/P value may be increased.

Now, the present invention will be described in more detail with reference to the following examples. These examples are provided only for illustration of the present invention and should not be construed as limiting the scope and spirit of the present invention.

Example and Comparative Example

As an example, a transparent substrate with a multilayer anti-glare coating including compositions summarized in Table 1 below was manufactured.

A method of sequentially forming first to fourth coating layers on a transparent substrate is not specifically limited, and includes vacuum deposition, particularly physical vapor deposition (PVD) including sputtering or chemical vapor deposition (CVD) including low pressure, normal pressure and plasma vapor deposition.

According to the Example, a transparent substrate with a multilayer anti-glare coating was manufactured by continuously vacuum-depositing the first to fourth coating layers according to a magnetron sputtering manner. In particular, an oxide layer may be prepared by sputtering a precursor of a material of each layer in the presence of oxygen, or a nitride layer may be prepared by sputtering a precursor of a material of each layer in the presence of nitrogen. Such a method is suitable for manufacturing a large transparent substrate.

As a Comparative Example, a transparent substrate including compositions summarized in Table 2 below was manufactured.

TABLE 1

| Composition of multilayer coating | | Thickness [nm] | Refractive index [1] | Extinction coefficient [2] |
|---|---|---|---|---|
| Fourth coating layer | $SiO_2$ | 107.5 | 1.47 | 0.0 |
| Third coating layer | $Si_3N_4$ | 68 | 2.00 | 0.0 |
| Second coating layer | $WO_x$ (x = 0 to 3) | 48.5 | 1.92 | 0.202 |
| First coating layer | $Si_3N_4$ | 7 | 2.00 | 0.0 |

| Composition of transparent substrate | | Thickness [mm] | Transmissivity[3] | Reflectivity[4] |
|---|---|---|---|---|
| Transparent substrate | Glass substrate | 2.1 | 90.8% | 8.37% |
| | PVB | 0.8 | 91.9% | 7.24% |
| | Glass substrate | 2.1 | 90.8% | 8.37% |

TABLE 2

| Composition of transparent substrate | Thickness [mm] | Transmissivity[3] | Reflectivity[4] |
|---|---|---|---|
| Glass substrate | 2.1 | 90.8% | 8.37% |
| PVB | 0.8 | 91.9% | 7.24% |
| Glass substrate | 2.1 | 90.8% | 8.37% |

[1] Refractive index of light having wavelength of 550 nm.
[2] Extinction coefficient of light having wavelength of 550 nm.
[3] Transmissivity of light having wavelength range of 380 to 780 nm.
[4] Reflectivity of light having wavelength range of 380 to 780 nm.

Experimental Example—Measurement of Reflectivity and S/P Value on a Coated Side

Using a transparent substrate with a multilayer anti-glare coating manufactured according to the Example and a transparent substrate manufactured according to the Comparative Example, transmissivity and an absorption ratio of light having a wavelength range of 380 to 780 nm were measured using a spectral transmittance meter (Model Name: Lambda 950 available from Perkin Elmer). Results are summarized in FIG. 2. In addition, an average of values obtained by multiplying the results by a weighting function corresponding to AM1.5 according to an ISO13837 standard was found. Resultant values are summarized in Table 3 below.

In addition, reflectivity per installation angle (50°, 60° and 70°) of the transparent substrates according to the Example and the Comparative Example was measured. Results are summarized in Table 3 below.

In addition, the transparent substrates according to the Example and the Comparative Example were illuminated using a halide lamp (400 W daylight metal halide lamp, Dedolight 400D), which illuminates a visible light area similar to sunlight, and a high intensity discharge (HID) lamp, and S/P values thereof were measured. Results are summarized in Table 3 below.

TABLE 3

| Items | Trans-missivity* [%] | S/P per light source | | Reflectivity per installation angle of front glass [%] | | |
|---|---|---|---|---|---|---|
| | | Halide lamp | High-intensity discharge lamp | 50 degree | 60 degree | 70 degree |
| Comparative Example | 87.5 | 0.64 | 0.69 | 10.8 | 15.4 | 26.8 |
| Example | 70.9 | 0.69 | 0.74 | 5.6 | 9.0 | 18.3 |

In Table 3, the expression "transmissivity*" denotes transmissivity of light having a wavelength range of 380 to 780 nm.

Referring to Table 3, in Example, transmissivity of light having a wavelength range of 380 to 780 nm is 70.9%. In a regulation of automobile glass, it is specified that transmissivity of 70% or more should be secured. Accordingly, it can be confirmed that the Example satisfies this regulation.

In addition, the Example including the anti-glare multilayer coating exhibits low reflectivity, compared to the Comparative Example, as described below. In particular, a reflectivity of 10% or less within a wavelength range of 380 to 780 nm based on an installation angle of 50 to 60° and a reflectivity of 20% or less within a wavelength range of 380 to 780 nm based on an installation angle of 50 to 70° are exhibited.

Accordingly, when the transparent substrate according to the Example is used as a front glass of automobiles, almost no veiling reflection wherein a faint shape of a dashboard is formed in a front glass occurs, and thus, the sight of the driver may be secured.

Figure 2:
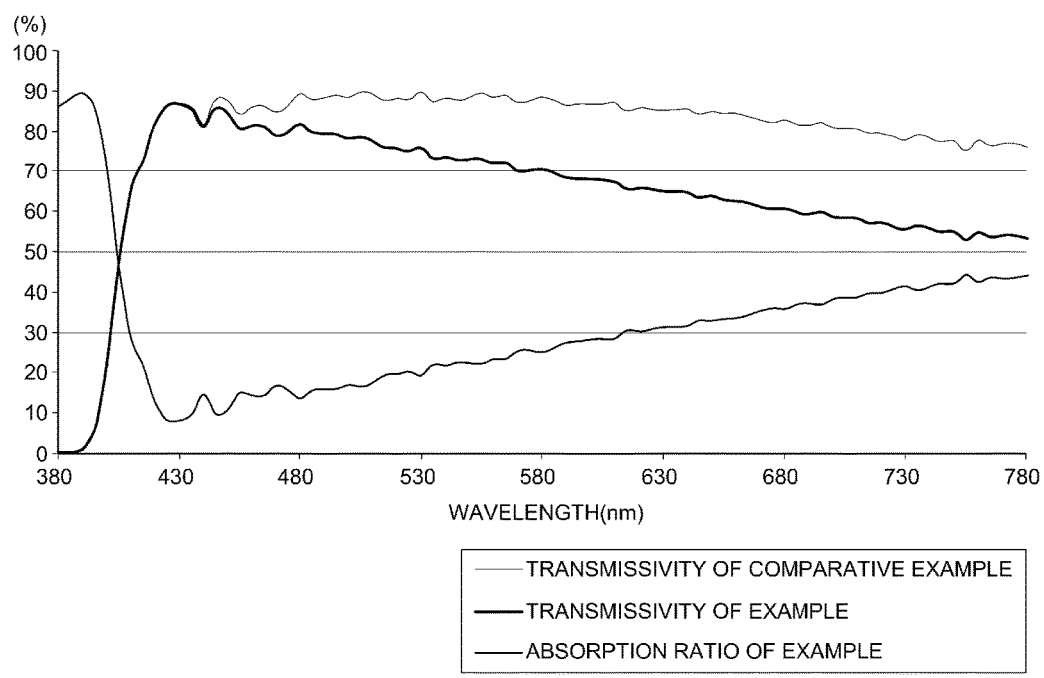
FIG. 2 illustrates graphs representing transmissivity and absorption ratio of a transparent substrate with multilayer anti-glare coating for visible light according to an Example and a Comparative example.

Referring to FIG. 2, it can be confirmed that the transparent substrate according to the Example absorbs light having a wavelength range of 530 to 780 nm that is easily distinguished in daytime. Accordingly, according to the Example, transmissivity of light having the wavelength range is decreased, compared to the Comparative Example. This means that, in the Example, an S/P value as a ratio of the luminous flux of scotopic vision with respect to photopic vision is high, compared to the Comparative Example. Such a result can be numerically confirmed from Table 3.

Accordingly, when the transparent substrate according to the Example is used as a front glass of an automobile, disability glare caused by the light of headlights of automobiles coming on the other side is remarkably decreased, thereby promoting driver safety.

As described above, the transparent substrate with a multilayer anti-glare coating according to the present disclosure includes the composition described above, thus having the following effects.

The transparent substrate with a multilayer anti-glare coating according to the present disclosure has low reflectivity, thereby preventing a veiling phenomenon wherein light reflected from a dashboard is re-reflected from a front glass of an automobile and thus the sight of a driver is disturbed.

The transparent substrate with a multilayer anti-glare coating according to the present disclosure has a high ratio of the luminous flux of scotopic vision with respect to photopic vision, thereby preventing disability glare wherein, at night, light from the headlights of automobiles coming on the other side reaches the eyes of drivers and thus causes a temporary visual disorder.

The transparent substrate with a multilayer anti-glare coating according to the present disclosure has low reflectivity and decreases light intensity by absorbing illuminated light, thereby more effectively preventing a veiling phenomenon and disability glare.

Effects of the present disclosure are not limited to the effects referred above. It should be understood that effects of the present disclosure include all effects that may be inferred from the descriptions of the present disclosure.

The disclosure has been described in detail with reference to multiple embodiments thereof. However, it will be appreciated by those skilled in the art that changes may be made in these embodiments without departing from the principles and spirit of the disclosure, the scope of which is defined in the appended claims and their equivalents.

What is claimed is:

1. A transparent substrate with a multilayer anti-glare coating, the transparent substrate comprising:
    a transparent substrate;
    a first coating layer formed on the transparent substrate and being formed of a first dielectric layer having a refractive index of n1;
    a second coating layer formed on the first coating layer and having a refractive index of n2;
    a third coating layer formed on the second coating layer and being formed of a second dielectric layer having a refractive index of n3; and
    a fourth coating layer formed on the third coating layer and being formed of a third dielectric layer having a refractive index of n4,
    wherein n1=n3>n2>n4,
    the second coating layer has an extinction coefficient within the range 0.01 to 0.03, and
    the second coating layer comprises at least one selected from the group consisting of tungsten (W) oxide, iron (Fe) oxide and titanium (Ti) nitride, or a combination thereof.

2. The transparent substrate according to claim 1, wherein n1 and n3 are within the range 1.9 to 2.5,
    n2 is within the range 1.8 to 2.5, and
    n4 is within the range 1.3 to 1.6.

3. The transparent substrate according to claim 1, wherein a thickness of the first coating layer is 1 to 50 nm,
    a thickness of the second coating layer is 10 to 150 nm,
    a thickness of the third coating layer is 10 to 100 nm, and
    a thickness of the fourth coating layer is 30 to 200 nm.

4. A glass for automobiles comprising the transparent substrate according to claim 1, wherein the transparent substrate is installed at an angle of 50 to 70° from a direction perpendicular to the ground.

5. The transparent substrate according to claim 1, wherein the first coating layer and the third coating layer comprise at least one selected from the group consisting of zinc oxide, tin oxide, zirconium oxide, zinc-tin oxide, titanium oxide, titanium oxynitride, niobium oxide, silicon nitride, silicon-aluminum nitride and titanium nitride.

6. The transparent substrate according to claim 1, wherein the fourth coating layer comprises at least one selected from the group consisting of silicon oxide, silicon oxynitride, silicon oxycarbide, silicon-aluminum oxide and silicon-aluminum nitride, or a combination thereof.

7. A glass for automobiles comprising the transparent substrate with the multilayer coating according to claim 1.

* * * * *